United States Patent [19]

Monson et al.

[11] Patent Number: 4,969,090

[45] Date of Patent: Nov. 6, 1990

[54] PROGRAM ROUTINE VECTORING CIRCUIT FOR SELECTIVELY USING EITHER STORED INTERUPT INSTRUCTIONS OR INCOMING INTERUPT HANDLING INSTRUCTIONS

[75] Inventors: John D. Monson, West Valley; Gordon E. Smith, Sandy, both of Utah

[73] Assignee: Beehive International, Salt Lake City, Utah

[21] Appl. No.: 95,814

[22] Filed: Sep. 11, 1987

[51] Int. Cl.[5] .......................... G06F 9/46; G06F 9/30; G06F 13/12; G06F 9/305

[52] U.S. Cl. .................................. 364/200; 364/230.2; 364/231.5; 364/232.23; 364/263.2; 364/270.6; 364/246.1; 364/270.7; 364/200; 364/242; 364/241.2; 364/241.5; 364/237.1

[58] Field of Search ... 364/200 MS File, 900 MS File

[56] References Cited

U.S. PATENT DOCUMENTS

| | | | |
|---|---|---|---|
| 4,434,460 | 2/1984 | Drakenborn et al. | 364/200 |
| 4,476,543 | 11/1984 | Quinones et al. | 364/900 |
| 4,527,236 | 7/1985 | Ermolouich | 364/200 |
| 4,646,232 | 2/1987 | Chang et al. | 364/200 |
| 4,665,501 | 5/1987 | Saldin et al. | 364/900 |
| 4,709,329 | 11/1987 | Hecker | 364/200 |
| 4,758,950 | 7/1988 | Cruess et al. | 364/200 |
| 4,862,354 | 8/1989 | Fiacconi et al. | 364/200 |

*Primary Examiner*—Archie E. Williams, Jr.
*Assistant Examiner*—Glenn Richman
*Attorney, Agent, or Firm*—Thorpe, North & Western

[57] ABSTRACT

A program routine vectoring system for use in a data processing system has a central processing unit and input circuitry for receiving interrupt information. The system includes read only memory for storing address information and instructions to be executed by the central processing unit, a signalling circuit for signalling the central processing unit when the input circuitry receives an interrupt request, to cause the central processing unit to retrieve initial address information from the read only memory, a decoder for decoding the retrieved address information supplied by the central processing unit and for producing a first signal if certain address information is supplied, and a second signal if other address information is supplied, and a multiplexer responsive to the first signal for supplying to the read only memory first instruction address information to cause the read only memory to supply to the central processing unit a first address in the read only memory containing instructions for processing the interrupt request, and responsive to the second signal for supplying to the read only memory second instruction address information to cause the read only memory to supply to the central processing unit a second address in the read only memory containing other instructions for processing the interrupt request.

3 Claims, 2 Drawing Sheets

PRIOR ART

Fig. 1       PRIOR ART
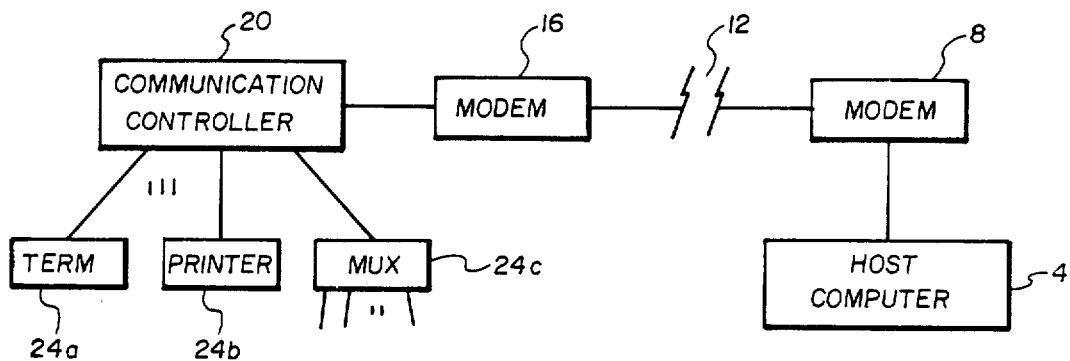
Fig. 2
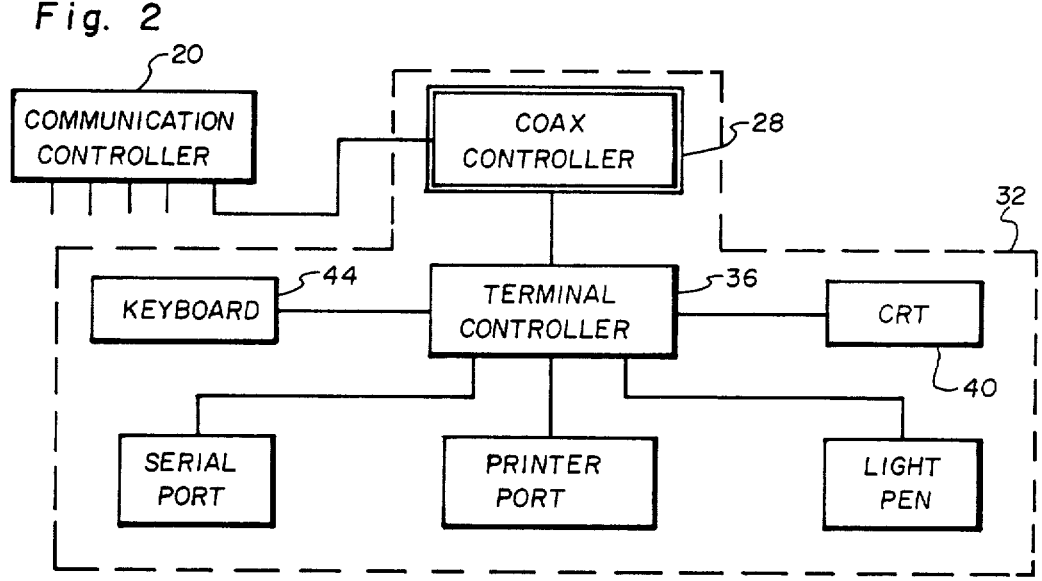
Fig. 4
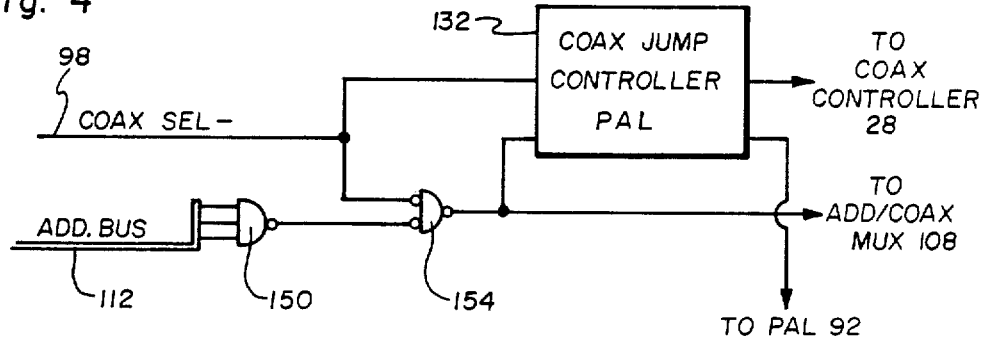

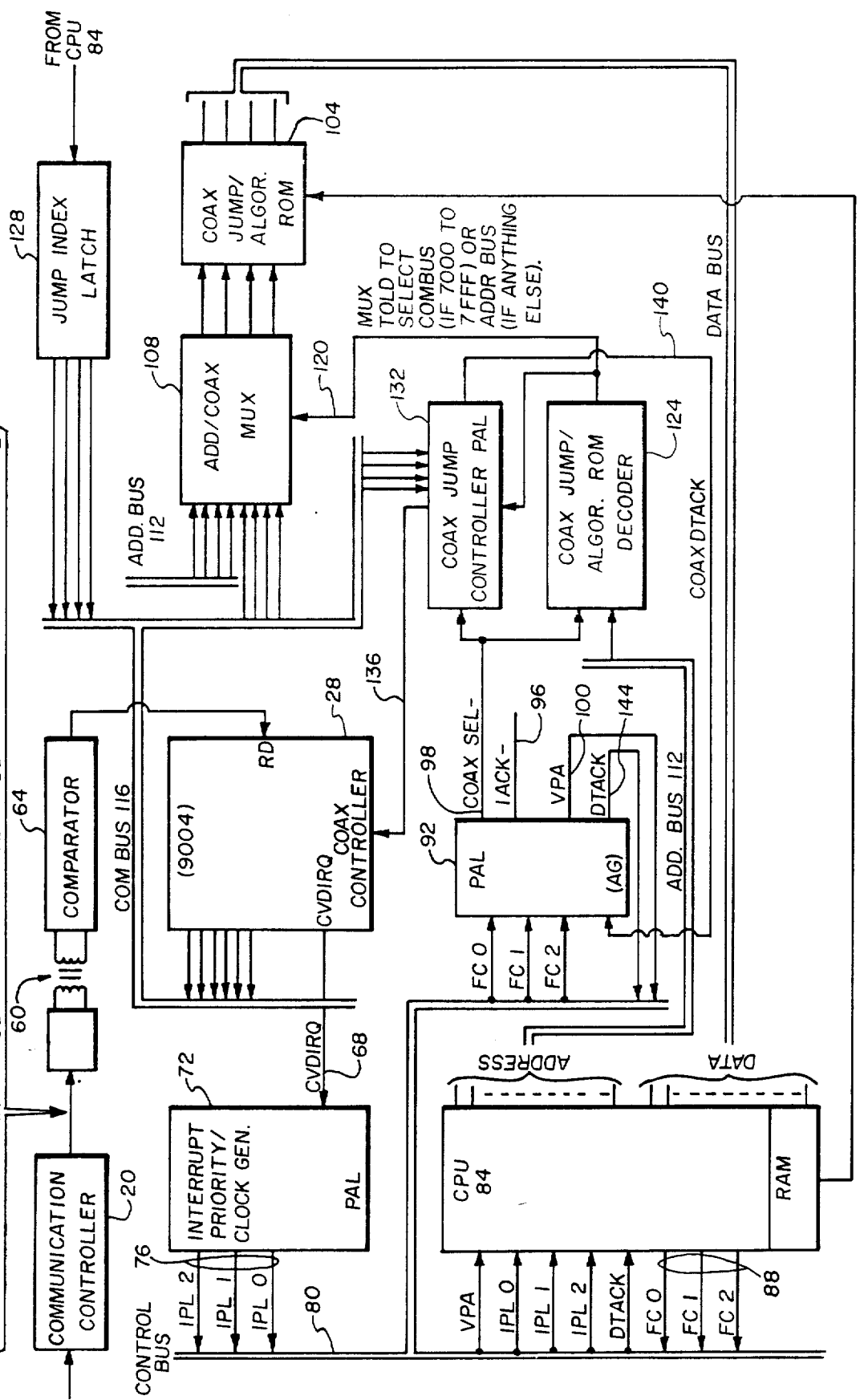

PROGRAM ROUTINE VECTORING CIRCUIT FOR SELECTIVELY USING EITHER STORED INTERUPT INSTRUCTIONS OR INCOMING INTERUPT HANDLING INSTRUCTIONS

BACKGROUND OF THE INVENTION

This invention relates to a method and system for responding to interrupt requests in a peripheral data handling unit.

Data processing systems may be organized in a variety of configurations, using a variety of combinations of computer and computer peripheral equipment. One commonly used configuration involves employment of a mainframe host computer, such as an IBM 4300 or 370 series, for performing the primary storage, computational and data processing functions, peripheral units such as printers, video display terminals, keyboard input units, multiplexers, etc., a communication controller such as an IBM 3274 controller for controlling communications between the host computer and the peripheral units, and a communications system incorporating, for example, a pair of modems and a telephone line for interconnecting the communications controller and the host computer. With this configuration, the host computer may operate in parallel with the peripheral units, be interrupted by the peripheral units, and interrupt the peripheral units, all in the course of carrying out data processing functions.

In order to efficiently manage communications between the host computer and the peripheral units, it is necessary that the communications controller operate as rapidly as possible to contact (interrupt), establish communication connections with, pass information to, and terminate connections with the peripheral units. This requirement of speed for the communications controller, although increasing overall efficiency of the system, imposes corresponding speed requirements on the peripheral units. In particular, the peripheral units must generally respond to interrupt requests from the communications controller within a predetermined period of time, (for example, by generating an appropriate acknowledgment signal) or lose contact with the communications controller.

One prior art approach to increasing the speed of peripheral units so that they can interface with communication controllers is simply to provide the peripheral units with faster, more powerful and thus more costly control elements, such as microprocessors. With the faster control elements, the processing steps necessary to respond to an interrupt request can be carried out within the time allowed by the communications controller. These steps might, for example, include a vectoring jump, and table look-up sequence to find the address in memory where there are stored the instructions for handling the interrupt request. This sequence, especially the table look-up portion, can be very time consuming unless extra fast control elements are employed and these, as indicated, are costly.

SUMMARY OF THE INVENTION

It is an object of the invention to provide a new and improved method and apparatus to enable peripheral units to respond to interrupt requests.

It is another object of the invention to provide such a method and apparatus for responding to interrupt requests in a fast and efficient manner.

It is a further object of the invention to provide such a method and apparatus without placing increased processing demands on the peripheral unit's processor or microprocessor.

The above and other objects and advantages of the invention are realized in a specific illustrative embodiment of a program routine vectoring system for responding to interrupt requests. This embodiment is designed to operate in a data processing environment which includes a central processing unit and input circuitry for receiving interrupt requests. The embodiment includes a read only memory for storing both address information and instructions or algorithms to be executed as needed by the central processing unit, interrupt request acknowledgment circuitry for signalling the central processing unit when the input circuitry receives an interrupt request to thereby cause the central processing unit to retrieve initial address information from the read only memory, and decoder circuitry for decoding the retrieved address information supplied by the central processing unit and for producing a first signal if certain address information is supplied, and a second signal if other address information is supplied. The system also includes multiplexer switching circuitry which is responsive to the first signal for supplying to the read only memory first instruction address information to cause the read only memory to supply to the central processing unit a first address in the read only memory containing instructions for processing the interrupt request, and responsive to the second signal for supplying to the read only memory second instruction address information to cause the read only memory to supply to the central processing unit a second address in the read only memory containing other instructions for processing the interrupt request. The first and second instruction address information is derived from either the currently received interrupt request information or previously processed information. By using interrupt request information or previously processed information as a locator for stored instructions, conventional table look-up procedures for locating instructions can be avoided.

In accordance with one aspect of the invention, the program routine vectoring system further includes logic means for temporarily storing received interrupt request information and previously processed information, and for supplying either the interrupt request information or the previously processed information to the multiplexer switching circuitry when the interrupt request information includes either a command or data respectively. In other words the nature of the interrupt request information determines what information is supplied to the multiplexer switching circuitry to serve as the first instruction address information.

BRIEF DESCRIPTION OF THE DRAWINGS

The above and other objects, features and advantages of the invention will become apparent from a consideration of the following detailed description presented in connection with the accompanying drawings in which:

FIG. 1 is a block diagram of a conventional data processing system in which a host computer interacts with a plurality of peripheral units;

FIG. 2 is a block diagram showing the communications controller of FIG. 1 connected to a typical peripheral unit in accordance with the principles of the present invention;

FIG. 3 is a block diagram schematic showing the coax controller and terminal controller of FIG. 2, constructed in accordance with the principles of the present invention; and FIG. 4 is a circuit schematic showing the coax jump controller programmable array logic and coax jump/algorithm ROM decoder of FIG. 3.

DETAILED DESCRIPTION

FIG. 1 shows a data processing system environment in which the present invention might be employed. This environment includes a mainframe host computer, such as an IBM 4300 or 370 series, for performing the large scale storage, computational and data processing functions for the system. The host computer 4 is coupled by way of a modem 8 to a communication link 12 such as a telephone line, satellite transmission channel, or the like. The other end of the communication link 12 is coupled by way of a modem 16 to a communication controller 20, such as the IBM 3274 controller. The communication controller 20 supervises and controls the transmittal of information between the host computer 4 and a plurality of peripheral units 24. Examples of such peripheral units include a terminal controller 24a, a printer 24b, and a multiplexer unit 24c which, in turn, is coupled to other peripheral units 24d. The host computer, of course, may operate to process information in parallel with the operation of the peripheral units and also be interrupted by and do the interrupting of the peripheral units. All this is conventional data processing hardware and methodology.

FIG. 2 shows the communication controller 20 as it might be coupled to a conventional peripheral unit 32. The peripheral unit 32 includes a coax controller 28, a terminal controller 36 coupled to a cathode ray tube (CRT) display 40, and a keyboard input device 44. The terminal controller 36 is also coupled to a serial port circuit 44a, a printer port circuit 44b and a light pen 44c to provide the functions indicated.

FIG. 3 shows the circuit components of the coax controller 28 and terminal controller 36 of the FIG. 2 peripheral unit 32. The communication controller 20 of course is coupled by way of communication link to a host computer 4 and also by way of a transformer 60 and a comparator 64 to the coax controller 28 (FIG. 3). The transformer 60 is provided for isolation with no step up or step down of the signal voltage or current. The comparator 64 is provided for conditioning and shaping the incoming signal so that it may be processed by the rest of the circuitry of FIG. 3.

When the host computer 4 desires to communicate with or command terminal 32 (FIG. 2), it transmits to the communication controller 20 (FIG. 3) the desired commands or data using a conventional protocol such as System Network Architecture (SNA) or Bi Sync (BSC). The communication controller 20 interprets the protocol commands or data and, in turn, instructs (signals) the terminal 32 (FIG. 2) via the coax controller 28. This communication is initiated by transmission to the terminal 32 of what is termed a "code violation" sequence of information to interrupt the operation of the terminal. The function of the code violation sequence is to advise the terminal that additional information, a command or data, is forthcoming. Such a sequence is received by the communication controller 20 and passed via the transformer 60 and comparator 64 to the coax controller 28. The coax controller 28 is a conventional serializer/deserializer control chip such as Standard Microsystem COM 9064. In response to receipt of this sequence, the coax controller 28 supplies a CVDIRQ output 68a (code violation detect interrupt request) via lead 68 to an interrupt priority/clock generator 72. This unit is a conventional progammable array logic such as PAL 16R8, which operates to determine the priority level of the incoming interrupt request (from the received CVDIRQ output) and supply an output via leads 76 to a control bus 80 to identify the priority level. The priority level of the interrupt request determines the order and speed at which a central processing unit (CPU) 84 of the terminal controller 86 will respond to the interrupt request. Three lines 76 connect the interrupt priority/clock generator 72 to the control bus 80 and ultimately to the CPU 84 so that eight priority levels can be identified.

Upon receipt of the signals identifying the priority level of the interrupt request (designated in FIG. 3 as IPL0, IPL1 and IPL2), the CPU 84 supplies function codes (designated in FIG. 3 as FC0, FC1 and FC2) on lines 88 to the control bus 80 and these are supplied to programmable array logic (PAL) unit 92. In producing these signals, the CPU 84 enters its interrupt acknowledge mode—this actually takes place at the end of execution of the instruction then being processed. The function codes supplied to lines 88 advise that an interrupt request is being handled and the PAL 92 responds by developing an interrupt acknowledge signal (IACK) which is used internally by the PAL 92. The PAL 92 also develops a Coax SEL- signal (designated as Coax SEL in FIG. 3) on line 98 and a "valid peripheral address" (designated as VPA in FIG. 3) signal output on lead 100 which is supplied back to the CPU 84. The VPA signal confirms to the CPU 84 the priority interrupt type (an autovector type interrupt) of the received interrupt request and this information is utilized by the CPU 84 to access a coax jump/algorithm read only memory 104 to read the address of where the instructions for handling the particular interrupt priority level in question resides. The CPU 84 then "vectors" to that address and begins to read the instructions there stored. The first instruction read by the CPU 84 is a so-called JUMP instruction which directs the CPU 84, to read the contents of the succeeding memory location to obtain the address of where the CPU 84 is to "jump" (this is known as the "jump address").

Instead of reading data from the succeeding location in the read only memory 104, the addresses in read only memory 104 of locations from which information is to be read are supplied by an address/coax multiplexer 108 (designated as Address/Coax MUX in FIG. 3). The multiplexer 108 supplies address information to the read only memory 104 either from an address bus 112 connected to the CPU 84 or from a COM BUS 116 connected to the COAX controller 28 and jump index latch 128. Whether the address bus 112 or the COM BUS 116 is selected to supply address information through the multiplexer 108 to the read only memory 104 is determined by the condition of input lead 120, i.e., the signal on lead 120. A coax jump/algorithm read only memory decoder 124 determines what signal is to be supplied to lead 120 as a result of decoding the address retrieved by the CPU 84 from read only memory 104. This address information is supplied by the CPU 84 to the decoder 124 which, if the address information is within a certain range of values, supplies a first signal from lead 120 to the multiplexer 108, and if the address information is outside of said range of values, supplies a second signal from lead 120 to multiplexer 108.

If the first signal is received by the multiplexer 108, it interconnects the COM BUS 116 to the read only memory 104, whereas if the second signal is received, the multiplexer 108 interconnects the address bus 112 to the read only memory 104. Connection of the address bus 112 to the read only memory 104 is the normal condition and mode of operation of the terminal. The sources of data (address information) for the COM BUS 116 is either the coax controller 28 or a jump index latch 128. The coax controller 28 has stored therein currently received interrupt request information, whereas the jump index latch 128 has stored therein previously processed information supplied to it by the CPU 84. Whether the interrupt request information stored in the coax controller 28 or the previously processed information stored in the jump index latch 128 is to be supplied to the COM BUS 116 for ultimate transfer to the read only memory 104 is determined by whether the interrupt request includes a command or data. If it includes a command, then command information would be supplied to the COM BUS 116 from the coax controller 28 and ultimately to a coax jump controller programmable array logic (PAL) unit 132. The combination of this information on the COM BUS 116 and a first signal on lead 120(indicating that the jump address has been decoded) being produced by decoder 124 causes the PAL 132 to signal the coax controller 28 via lead 136 (designated as "RDE" in FIG. 3) directing it to supply to the COM BUS 116 the stored interrupt request information. This information is then transferred via the multiplexer 108 to the read only memory 104 causing the read only memory 104 to supply instruction address information to the CPU 84 identifying the address or location of instructions for processing the interrupt request.

If the interrupt request contains a data word, as opposed to a command, then the CPU 84 would signal the jump index latch 128 to supply to the COM BUS 116 previously processed information. This information would then be transferred through the multiplexer 108 to the read only memory 104 which would supply different instruction address information identifying the locations of other instructions for processing the interrupt request.

The remaining alternative for address information being supplied to the read only memory 104 is if the second signal on lead 120 is supplied by the decoder 124 to the multiplexer 108. In that case, information on the address bus 112 placed there by the CPU 84 is transferred to the read only memory 104 to cause it to supply still a different set of instruction address information to the CPU 84.

In the manner described, the addresses in read only memory 104 containing instructions for processing interrupt requests are supplied either by the coax controller 28, if the interrupt request contains a command, or by the jump index latch 128, if the interrupt request contains data. The decoder 124 decodes the "jump address" from the CPU 84 and signals the multiplexer 108 to interconnect either the address bus 112 to the read only memory 104 or interconnect the COM BUS 116 to the read only memory 104. Thus the appropriate address in read only memory 104 containing instructions for processing interrupt requests is determined rapidly and without the requirement of performing a table lookup.

FIG. 4 shows the circuitry of the Coax Jump/Algor ROM Decoder 124 of FIG. 3. This circuitry includes a NAND gate 150 whose input is three lines of the address bus 112, and whose output is connected to one input of a negative logic AND gate 154. The other input of the AND gate 154 is connected to the Coax SEL- line 98, and the output of the AND gate is connected to the Coax Jump Cont PAL unit 132 and to the multiplexer 108. When the CPU 84 supplies the function codes to the PAL 92, it develops a "low" signal on the Coax SEL- line 98. At this time, the CPU also supplies address information to the address bus 112 and thus to the NAND gate 150. If the three lines to the NAND gate 150 are high (identifying a certain address), then the output of NAND gate 150 is low. Two "low" signals supplied to the negative logic AND gate 154 causes it to produce a low signal which is supplied to the multiplexer 108 as previously described (being, for example, the first signal on lead 120 described earlier), and to the PAL 132. The PAL 132, in turn, signals the PAL 92 on lead 132a which signals the CPU 84 via data transfer acknowledge (DTACK) line 144 (FIG. 3) that the CPU 84 may continue processing the interrupt request. PAL 132 also signals the Coax Controller 28 that it is being selected to either receive or send information. If any one of the these address lines of the address bus 112 to the NAND gate 150 is low, the output of the NAND gate 150 will be high and thus the output of AND gate 154 will be high, representing, for example, the second signal on lead 120 previously discussed.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. In a data processing system which includes a central processing unit and input circuitry for receiving interrupt information, including interrupt requests, commands and data, from external sources, a system for responding to interrupt requests comprising
    (a) memory means for storing address information and instructions to be executed by the central processing unit;
    (b) means for signalling the central processing unit when the input circuitry receives an interrupt request, to cause the central processing unit to retrieve initial address information from the memory;
    (c) decoder means for decoding the retrieved address information supplied by the central processing unit and for producing a first signal if certain address information is supplied, and a second signal if other address information is supplied;
    (d) multiplexer means responsive to the first signal for supplying to the memory a first instruction address to cause the memory to supply to the central processing unit instructions for processing the interrupt request, and responsive to the second signal for supplying to the memory a second instruction address to cause the memory to supply to the central processing unit other instructions for processing the interrupt request;
wherein the signalling means comprises logic means for storing interrupt information received by the input circuitry; wherein the system further comprises means coupling the multiplexer means to the logic means to enable the multiplexer means to supply to the memory means, in response to the first signal, interrupt information stored in the logic means, the interrupt information comprising the first instruction address; wherein the coupling means comprises a first data bus; wherein the decoder means includes means for producing an enable signal when the interrupt information is of one value, wherein the central processing unit is programmed to produce a transfer signal when the interrupt information is of another value; and wherein the logic means comprises (i) controller means for temporarily storing received interrupt information and being responsive to the enable signal for supplying the stored interrupt information to the first data bus, and (ii) latch means for temporarily storing information previously processed by the central processing unit and being responsive to the transfer signal for supplying the previously processed information to the first data bus.

2. A system as in claim 1 wherein the decoder means comprises binary logic for producing a first binary signal when the certain address information is supplied, and for producing a second binary signal when the other address information is supplied, and programmable array logic responsive to the first binary signal and to the certain address information having the one value for producing the enable signal.

3. A system as in claim 1 wherein the signalling means further comprises an interrupt priority generator responsive to receipt of an interrupt request for producing a priority signal identifying the priority level of the interrupt request and supplying the priority signal to the central processing unit to thereby identify to the central processing unit the location in read only memory from which the central processing unit is to retrieve the initial address information.

* * * * *